US012078008B2

(12) United States Patent
Iglesias Ballester

(10) Patent No.: US 12,078,008 B2
(45) Date of Patent: Sep. 3, 2024

(54) CLOSURE SYSTEM FOR DOOR OPENINGS

(71) Applicant: AMISERRU, S.L., Sant Cugat del Valles (ES)

(72) Inventor: Miguel Angel Iglesias Ballester, Sant Cugat del Valles (ES)

(73) Assignee: AMISERRU, S.L., Sant Cugat del Valles (ES)

( * ) Notice: Subject to any disclaimer, the term of this patent is extended or adjusted under 35 U.S.C. 154(b) by 236 days.

(21) Appl. No.: 17/639,326

(22) PCT Filed: Jan. 22, 2021

(86) PCT No.: PCT/ES2021/070046
§ 371 (c)(1),
(2) Date: Feb. 28, 2022

(87) PCT Pub. No.: WO2021/152194
PCT Pub. Date: Aug. 5, 2021

(65) Prior Publication Data

US 2022/0333435 A1 Oct. 20, 2022

(30) Foreign Application Priority Data

Jan. 28, 2020 (ES) ............................ ES202030065

(51) Int. Cl.
*E06B 5/16* (2006.01)
*E05D 15/06* (2006.01)
(Continued)

(52) U.S. Cl.
CPC ................ *E06B 5/16* (2013.01); *E05D 15/06* (2013.01); *E05F 15/60* (2015.01); *E06B 3/80* (2013.01); *A62C 2/10* (2013.01)

(58) Field of Classification Search
CPC ... E06B 5/16; E06B 3/80; E05D 15/06; E05F 15/60; A62C 2/10; A62C 2/18
See application file for complete search history.

(56) References Cited

U.S. PATENT DOCUMENTS 840,011 A * 1/1907 Ripson ..................... E06B 5/16 52/456
1,238,041 A * 8/1917 Miller ...................... E06B 9/82 160/7
(Continued)

FOREIGN PATENT DOCUMENTS

CN 105822201 8/2016
CN 107313701 11/2017
(Continued)

OTHER PUBLICATIONS

WIPO, International Search Report for PCT/ES2021/070046, Mar. 15, 2021.

*Primary Examiner* — Jessie T Fonseca
(74) *Attorney, Agent, or Firm* — Hodgson Russ LLP

(57) ABSTRACT

A closure system for door openings defined in a wall (P) and comprising: a quick-opening door (1) adjustedly installed within the door opening (H) and featuring a flexible roll-up sheet (11), an upper casing (12), and vertical uprights (3) equipped with guides (31) for the displacement of the flexible sheet (11); a fire door (2) installed at one side of the wall and comprising at least one fireproof layer (21, 23), for the opening and closure of the door opening (H), a perimeter frame constituted by the vertical uprights (3) and a rearward fireproof cover (4) of the upper casing (12) of the quick-opening door (1).

15 Claims, 5 Drawing Sheets

(51) Int. Cl.

| | |
|---|---|
| ***E05F 15/60*** | (2015.01) |
| ***E06B 3/80*** | (2006.01) |
| *A62C 2/10* | (2006.01) |

(56) References Cited

U.S. PATENT DOCUMENTS

| | | | | |
|---|---|---|---|---|
| 1,617,440 | A * | 2/1927 | Duncanson | A62C 2/16<br>160/8 |
| 5,501,045 | A * | 3/1996 | Wexler | E06B 5/164<br>52/232 |
| 2006/0048466 | A1 * | 3/2006 | Darnell | E06B 1/32<br>52/204.1 |
| 2015/0135596 | A1 * | 5/2015 | Cooper | E05D 15/165<br>49/423 |
| 2016/0102489 | A1 * | 4/2016 | Iglesias Ballester | E06B 3/4645<br>160/63 |

FOREIGN PATENT DOCUMENTS

| | | | | |
|---|---|---|---|---|
| EP | 2014866 | A1 * | 1/2009 | E06B 9/063 |
| EP | 3006661 | | 4/2016 | |
| ES | 2675200 | | 7/2018 | |
| GB | 2269097 | A * | 2/1994 | A62C 2/10 |
| GB | 2378204 | | 2/2003 | |
| GB | 2378204 | A * | 2/2003 | E05C 17/04 |
| JP | 2006312063 | | 11/2006 | |
| WO | WO-2013171442 | A2 * | 11/2013 | A62C 2/10 |

* cited by examiner

CLOSURE SYSTEM FOR DOOR OPENINGS

CROSS-REFERENCE TO RELATED APPLICATIONS

This application is a U.S. national stage entry of International Application No. PCT/ES2021/070046, filed Jan. 22, 2021, which claims priority to Spanish Application No. P202030065, filed Jan. 28, 2020, the entire disclosures of which are incorporated herein by reference.

FIELD

This invention relates to a closure system for door openings, in particular for door openings defined in a wall separating two rooms; said system comprising: —a quick-opening door featuring a flexible roll-up sheet, able to be displaced, between an opening position and a closing position of the door opening, along guides defined in vertical uprights; and —a fire door comprising a fireproof layer installed being able to be displaced with respect to a support guide between an opening position and a closing position of the door opening.

Therefore, this invention is applicable in the sector dedicated to the manufacture of enclosures.

BACKGROUND

As state of the art that is close to the invention, it is worth mentioning European patent EP 3 006 661 B1, of the same applicant of the present invention and validated in Spain as ES 2 675 200 T3.

Said background describes a closure system for through-openings defined in a wall separating two areas or rooms, and which combines: —a quick-opening door, provided with a flexible panel or sheet, that can be rolled up on a drum driven by a drive motor, and —a fire door that can be moved between an opening position and a closing position of the door opening.

In said background, the quick-opening door and the fire door are fixed on one same side of the wall and although the closure system fulfils the function for which it was developed, it has some aspects that could be improved.

One of said aspects is that the arrangement of both doors on one side of the wall means that the closure system protrudes entirely from said wall, occupying a space of considerable depth in the corresponding room.

Another drawback is that it requires the use of a quick-opening door of a certain constructive complexity, so that the fire door can effectively close the door opening without damaging the quick-opening door or interfering with the same.

To do this, said background uses a solution consisting of using a quick-opening door with vertical guides comprising: a fixed lower portion arranged on each of the sides of the through-opening, and a mobile upper portion, located above the through-opening and able to be vertically displaced between a lower position, wherein it is close to the fixed lower portion, and an upper position, wherein it is at a distance from the fixed lower portion and enables the fire door to be closed without interfering with said quick-opening door. This solution entails a certain constructive complexity and an increase in the cost of the quick-opening door compared to a conventional one.

Another general drawback of double doors, which combine a fire door with a quick-opening door, is that since the two doors are on one same side of the wall, the fire door must be oversized to cover the entire quick-opening door; this causes, on the one hand, that the door opening of the fire door be substantially larger than that of the quick-opening door, and therefore a perimeter portion of the opening for the fire door is not usable; and on the other hand, it causes extra manufacturing costs due to the oversizing of the fire door and the duplication of frames as each door has its own perimeter frame.

The applicant of the present invention is unaware of the existence of prior art that enable these drawbacks to be resolved and that have features analogous to those of the system of the present invention.

DESCRIPTION

The closure system for door openings, object of this invention, is applicable in particular to door openings defined in a wall separating two rooms; said system being of the type described in the preamble of the independent claim, i.e., comprising: a quick-opening door featuring a flexible roll-up sheet that can be rolled up on a motorised drum housed in an upper casing, and able to be displaced along vertical guides, between an opening position and a closing position of the door opening; and a fire door comprising at least one fireproof layer able to be displaced between an opening position and a closing position of the door opening.

The system of this invention has construction features that enable a quick-opening door and a fire door to be combined, significantly reducing manufacturing costs, simplifying the installation thereof in the door opening or through-opening, and ensuring that the door openings defined by both doors are dimensionally the same or very similar, all with adequate thermal insulation between both doors.

An essential feature of the invention is that the guides of the quick-opening door are defined in vertical uprights filled with suitable fireproof and insulating material, and which, together with a rearward fireproof cover of the upper casing of the quick-opening door, form a perimeter frame for closing the fire door. This enables the vertical uprights of the quick door together with the insulating rearward cover of the upper casing to make up the perimeter frame of the fire door and the door clearance opening.

Another relevant feature of the invention is that the quick-opening door is adjustedly installed within the door opening defined in the wall separating the two rooms; and the fire door, which closes against the vertical uprights and against the rearward cover of the upper casing of the quick-opening door, is installed on one of the sides of the wall.

This feature allows both doors to be installed quickly and easily, one inside the opening of the wall and the other on one of the sides of the wall without interference therebetween.

By sharing the perimeter frame, the fire door and the quick-opening door define door areas with dimensions equal to or practically equal to each other, and slightly smaller than the door opening in the wall.

This feature makes the oversizing of the fire door, the use of two independent frames, one for each door, and the excessive costs of manufacturing the same unnecessary.

In one embodiment of the invention, the vertical uprights are formed by single-piece profiles with a uniform cross section, filled with fireproof material.

In an alternative embodiment of the invention, said vertical uprights are formed by: —a front, vertical profile, in which the vertical guides of the quick-opening door are defined; —a rear profile for closing the fire door fixed to the front profile and —a layer of insulating material located between the front and rear profiles of said vertical uprights.

In the installation position, the quick-opening door is arranged within the door opening and the fire door is superimposed on one of the sides of the wall, thereby simultaneously achieving several advantages, including:

- the two doors share the vertical uprights, avoiding the duplication of frames, simplifying the installation thereof and reducing manufacturing costs;
- the opening and closing of each of the doors can be carried out freely, without risk of interference with the other door;
- the space required for installing the closure system is very small, since all or a significant portion of the thickness of the quick-opening door is within the opening of the wall, minimising the space occupied by said closure system in the adjoining rooms;
- the quick-opening door can have a conventional structure based solely on the dimensional requirements (length, width and height) of the door opening, and without the need to use more complex and costly structures to avoid the interference of the fire door and the quick-opening door.

According to the invention, the fire door can be of the sliding or swing type, depending on the space available for the installation thereof or on the customer's preference.

Another feature of the invention is that the quick-opening door and the fire door are completely independent, and can also be operated independently, which enables each of the doors to be opened or closed without taking into account the position of the other door, since, as mentioned, the solution proposed in this invention, in addition to minimising the space required for the installation thereof, prevents interference between the movements of the quick-opening door and of the fire door.

BRIEF DESCRIPTION OF THE DRAWINGS

As a complement to the description provided herein, and for the purpose of helping to make the features of the invention more readily understandable, the present specification is accompanied by a set of drawings which, by way of illustration and not limitation, represent the following.

DETAILED DESCRIPTION

Figure 1:
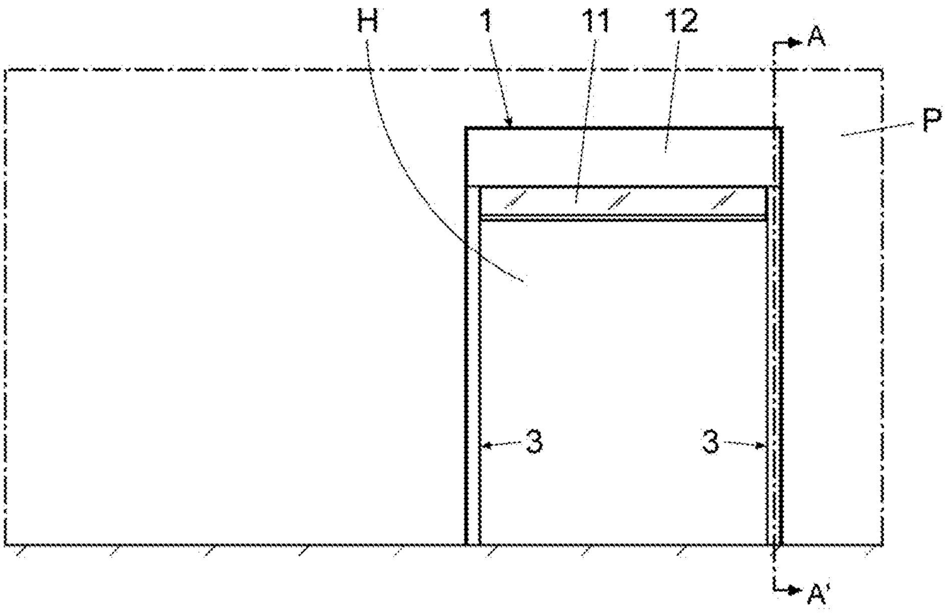
FIGS. 1 and 2 show respective front elevation and rear elevation general views, of the closure system of the invention, installed in a door opening defined in a wall separating two adjoining rooms.
Figure 2:
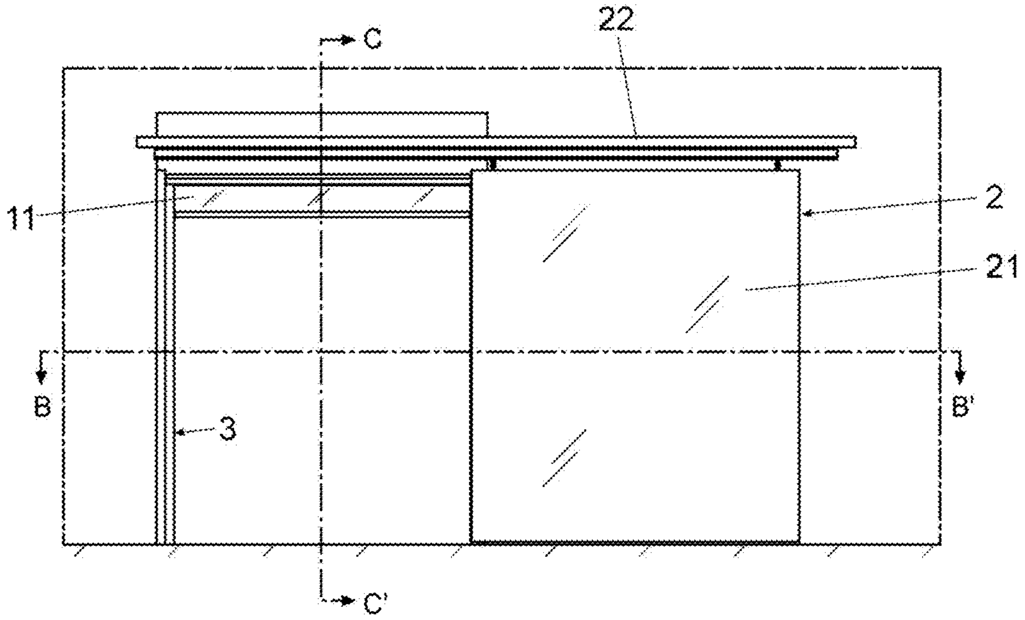
Figure 3:
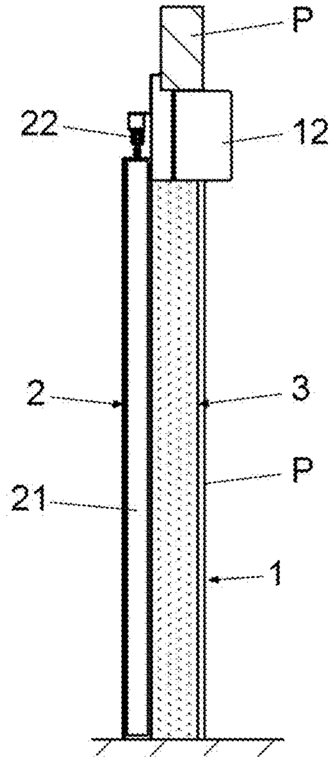
FIG. 3 corresponds to the cross section A-A' of FIG. 1.

The closure system object of the invention is installed on a wall (P) separating two adjoining rooms and featuring a door opening (H) between said rooms.

This system comprises a quick-opening door (1) and a fire door (2), which can be operated independently and are suitable for the opening and closing of the door opening (H).

The quick-opening door (1) comprises a flexible roll-up sheet (11) that can be rolled up on a motorised drum (not represented) housed in an upper casing (12) and able to be vertically displaced along guides (31) defined in vertical uprights (3), and between an opening position and a closing position of the door opening (H).

The quick-opening door (1) is adjustedly installed within the door opening (H), and can be entirely or mostly housed in said opening (H) depending on the thickness of the wall (P).

In FIGS. 1 to 7, the fire door (2) comprises a sliding fireproof layer (21) arranged on one of the sides of the wall (P) and installed being able to be horizontally displaced with respect to a support guide (22), between an opening position and a closing position of the door opening (H).

Said support guide (22) is fixed to the aforementioned side of the wall (P) forming the door opening (H), and located above, i.e., at a height greater than said door opening.

The fire door (2) comprises a perimeter frame that forms a support area in the closing position and is made up of the vertical uprights (3), carriers of the guides (31) along which the flexible sheet (11) of the quick-opening door (1) circulates, and of a rearward fireproof cover (4) of the upper casing (12) of the quick-opening door (1); so that both doors have a common clearance opening.

Figure 4:
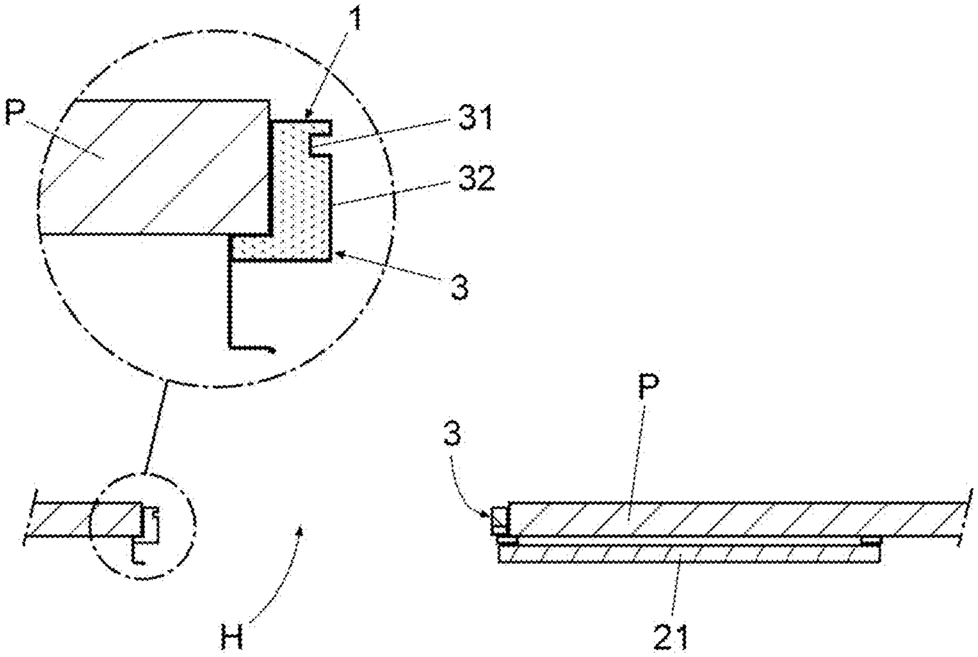
FIG. 4 corresponds to a cross section along the plane B-B' of FIG. 2 and an enlarged detail of a first embodiment of the system of the invention, wherein the vertical uprights are formed by single-piece profiles filled with fireproof material.

In the embodiment of FIG. 4, the vertical uprights (3) are formed by single-piece profiles (32) with a uniform cross section, filled with fireproof material.

Figure 5:
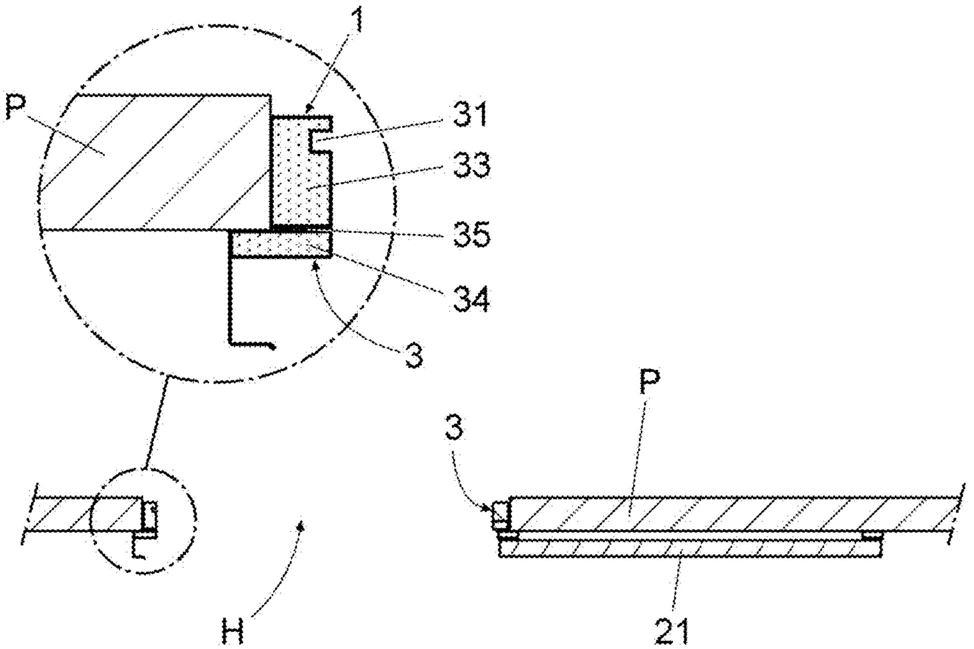
FIG. 5 corresponds to a cross section along the plane B-B' of FIG. 2 and an enlarged detail of a second embodiment of the system of the invention, wherein the vertical uprights are formed by a front profile and a rear profile fixed to each other, and an intermediate layer of insulating material arranged between both profiles.
Figure 6:
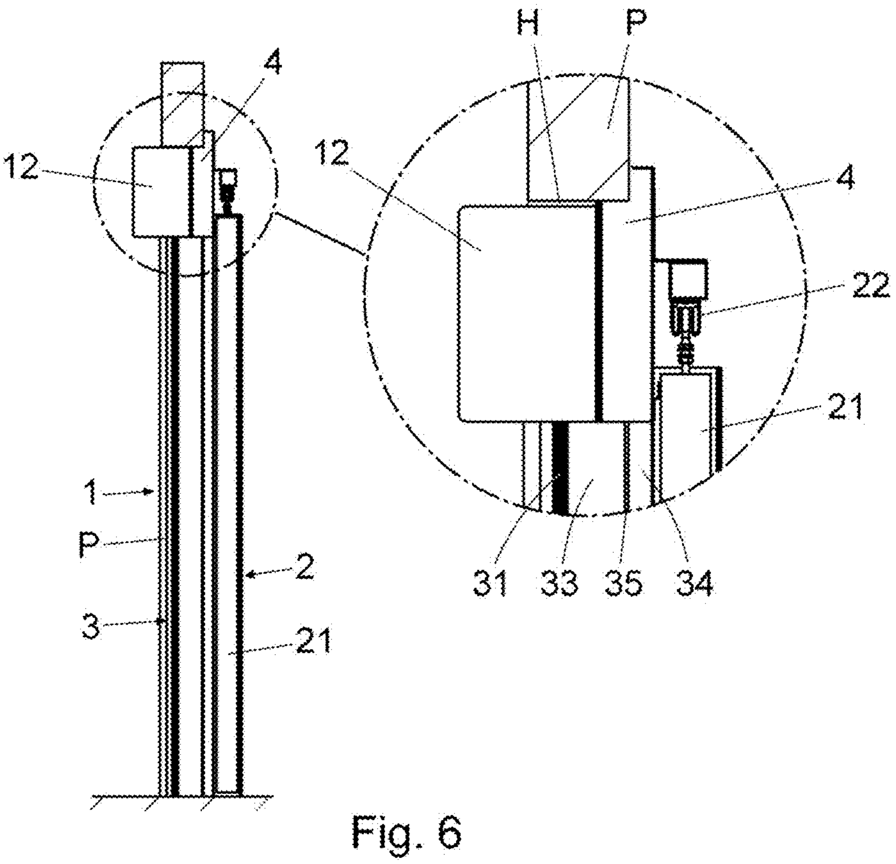
FIG. 6 shows the cross section C-C' of FIG. 2 and an enlarged detail of the system provided with the vertical uprights shown in FIG. 5.

In the embodiment of FIGS. 5 and 6, the vertical uprights (3) comprise: a front profile (33), wherein the vertical guides (31) of the quick-opening door (1) are defined; a rear profile (34) fixed to the front profile (33); and a layer of insulating material (35) located between the front and rear profiles (33, 34).

The detail view of FIG. 6 shows the rearward fireproof cover (4) of the upper casing (12) of the quick-opening door (1), which together with the vertical uprights (3) forms the closure area of the fire door (2).

The contact of the fireproof layer (21) against the closure area can be determined by a counterweight, by a change in direction of the support guide (22), or by any other means, since this does not affect the essence of the invention.

With the aforementioned features, the quick-opening door (1) and the fire door (2) can be operated independently, which enables them to be simultaneously or individually displaced to either the opening or closing position, without interfering with each other.

Figure 7:
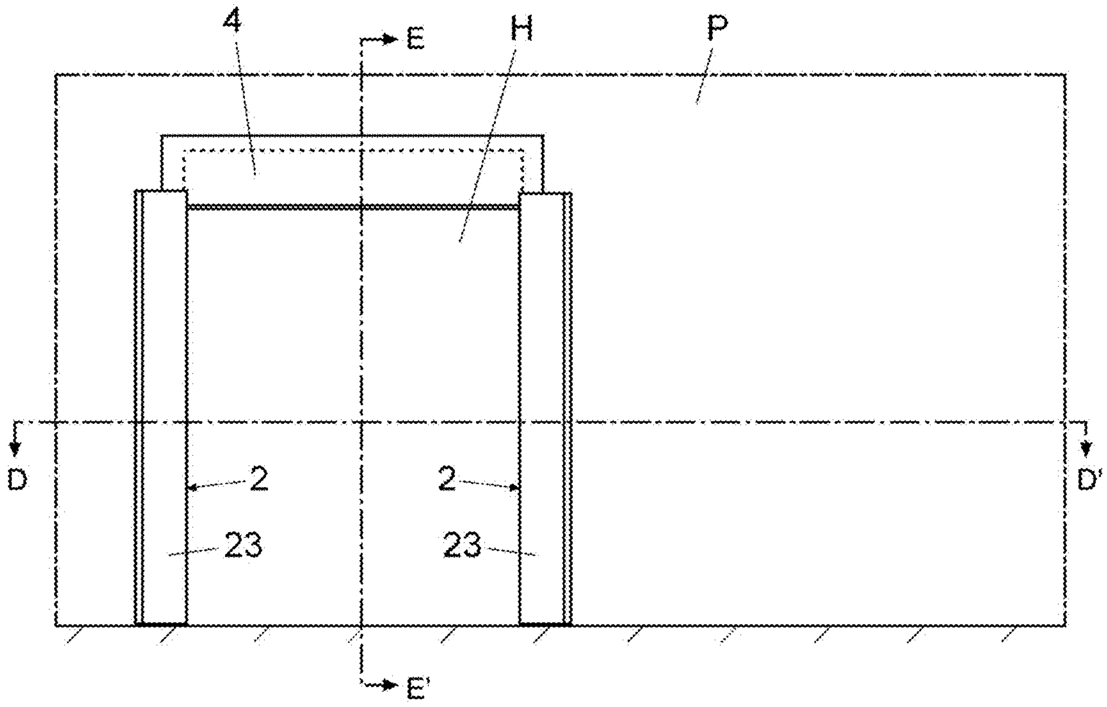
FIG. 7 shows a rear elevation view of a variant embodiment of the invention wherein the sliding fire door has been replaced by a fire door that can be opened, provided in this case with two layers that have been represented open.
Figure 8:
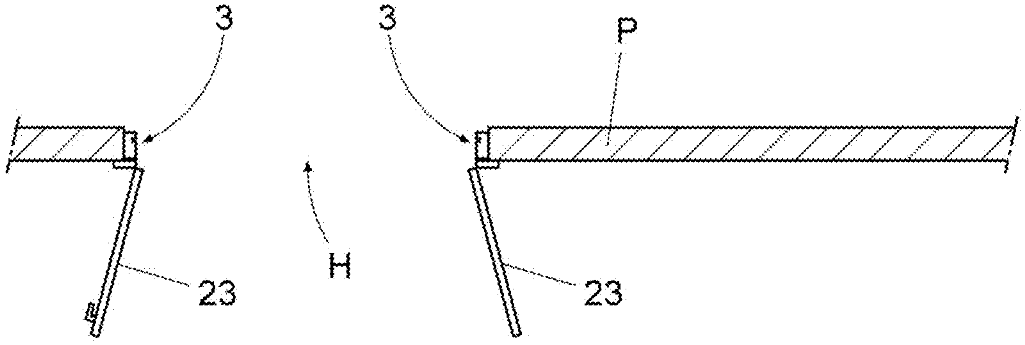
FIG. 8 corresponds to the cross section D-D' of FIG. 7.
Figure 9:
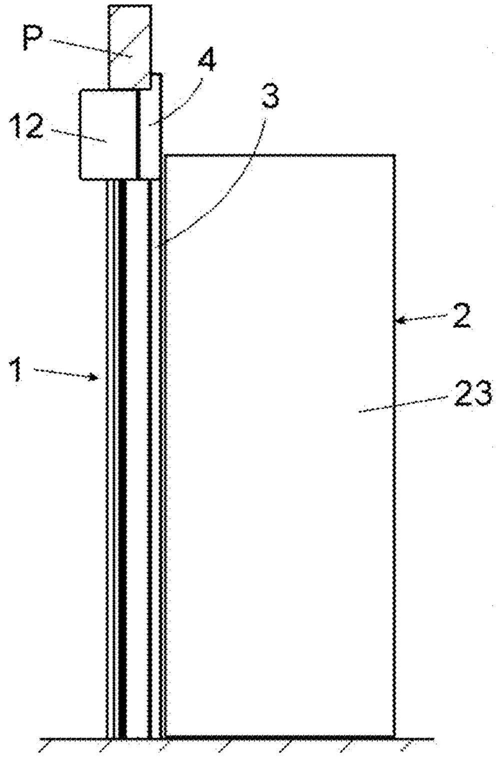
FIG. 9 corresponds to the cross section E-E' of FIG. 7.

FIGS. 7, 8 and 9 show a fire door (2) that can be opened, with two fireproof layers (23) that, if required, make frontal contact against the perimeter frame made up of the vertical uprights (3) and of the rearward fireproof cover (4) of the upper casing to perform the fire closure.

This alternative to the invention is provided to be able to locate the concept of this combined door in spaces wherein the placement of a sliding fire door is not possible due to lack of space on the sides. In this variant of the invention, the fire door has two layers although it can also have a single layer, depending on the dimensions.

The operation of this variant of the invention is the same as in the case of the sliding fire door (2). That is, the fire door that can be opened has the fireproof layers (23) in the normally open position, the quick-opening door (1) being the one that opens and closes the door opening (H) located in the wall (P) and, in the event that a fire is detected, the fireproof layers (23) of the fire door close automatically, either by means of an electromagnet that stops holding them in the open position or in another way, so that the door opening (H) is closed and protected against fire.

Having sufficiently described the nature of the invention, in addition to a preferred exemplary embodiment, it is hereby stated for the relevant purposes that the materials, shape, size and layout of the described elements may be modified, provided that it does not imply altering the essential features of the invention claimed below.

The invention claimed is:

1. A closure system for door openings defined in a wall separating two rooms, comprising:
- a quick-opening door including a flexible roll-up sheet configured to be rolled up on a motorized drum housed in an upper casing and configured to be displaced along guides defined in vertical uprights, between an opening position and a closing position of a door opening; and
- a fire door comprising at least one fireproof layer that can be displaced between an opening position and a closing position of the door opening;
- wherein the quick-opening door is adjustably installed within the door opening defined in the wall separating the two rooms;
- wherein the fire door is installed on one of the sides of the wall and comprises a perimeter frame made up of the vertical uprights and of a rearward fireproof cover of the upper casing of the quick-opening door;
- wherein the perimeter frame forms a support area for the at least one fireproof layer in the closing position; and
- wherein the fire door and the quick-opening door comprise a common and coincident clearance opening.

2. The system, according to claim 1, wherein the vertical uprights are formed by single-piece profiles with a uniform cross section, a portion of which is filled with fireproof material.

3. The system, according to claim 1, wherein the vertical uprights comprise:
- a front profile wherein the guides of the quick-opening door are defined;
- a rear profile for closing the fire door fixed to the front profile; and
- a layer of insulating material located between the front and rear profiles of the vertical uprights.

4. The system, according to claim 1, wherein the quick-opening door and the fire door can be operated independently.

5. The system, according to claim 1, wherein the fire door is a sliding door and comprises a fireproof layer arranged on said one of the sides of the wall and installed on a support guide being configured to be horizontally displaced between the opening position and the closing position of the door opening.

6. The system, according to claim 1, wherein the fire door is openable and comprises at least one fireproof layer configured to rotate between the opening position and the closing position of the door opening.

7. The system, according to claim 6, wherein the fire door comprises two openable fireproof layers.

8. The system, according to claim 2, wherein the quick-opening door and the fire door can be operated independently.

9. The system, according to claim 3, wherein the quick-opening door and the fire door can be operated independently.

10. The system, according to claim 2, wherein the fire door is a sliding door and comprises a fireproof layer arranged on said one of the sides of the wall and installed on a support guide being configured to be horizontally displaced between the opening position and the closing position of the door opening.

11. The system, according to claim 3, wherein the fire door is a sliding door and comprises a fireproof layer arranged on one of the sides of the wall and installed on a support guide being configured to be horizontally displaced between the opening position and the closing position of the door opening.

12. The system, according to claim 4, wherein the fire door is a sliding door and comprises a fireproof layer arranged on one of the sides of the wall and installed on a support guide being configured to be horizontally displaced between the opening position and the closing position of the door opening.

13. The system, according to claim 2, wherein the fire door is openable and comprises at least one fireproof layer configured to rotate between the opening position and a closing position of the door opening.

14. The system, according to claim 3, wherein the fire door is openable and comprises at least one fireproof layer configured to rotate between the opening position and the closing position of the door opening.

15. The system, according to claim 4, wherein the fire door is openable and comprises at least one fireproof layer configured to rotate between the opening position and the closing position of the door opening.

* * * * *